INVENTORS
HARRY LA TOUR AND
GEORGE DANIEL MILLER,
BY
ATTORNEYS

INVENTORS
HARRY LA TOUR AND
GEORGE DANIEL MILLER,
BY Jungblut, Melville, Grasser & Foster
ATTORNEYS.

United States Patent Office 3,330,931
Patented July 11, 1967

3,330,931
COLD FORMING TUBE MILL
Harry La Tour and George Daniel Miller, Middletown, Ohio, assignors to Armco Steel Corporation, Middletown, Ohio, a corporation of Ohio
Filed Oct. 8, 1964, Ser. No. 404,555
24 Claims. (Cl. 219—8.5)

This invention relates to apparatus for cold forming tubing from metallic strip, and has to do more particularly with the provision of an extremely compact and even portable mill particularly suited for use in the manufacture of small diameter steel tubing. This application is a continuation-in-part of application Ser. No. 326,448, filed Nov. 27, 1963, now abandoned.

Heretofore, when making steel tubing from cold strip, it has been the standard practice to progressively form the strip by means of a series of roll stands in a tube mill which may be thirty or more feet in length, the successive roll stands acting to progressively bend the strip until it assumes a tubular shape, whereupon a welding instrumentality acts to form a continuous seam along the meeting edges of the tubed strip. A mill of this character, with its many roll stands, not only represents a major initial investment, but additionally is expensive to maintain and operate. Each of the roll stands must be carefully adjusted and often times an appreciable quantity of scrap is produced before the tubing is of acceptable quality. Size changeovers are extremely time consuming by reason of the extensive adjustments which are required, including the necessity of changing the size of the rolls in each stand. As a result of the multitude of adjustments and related problems, such as the tooling required for each size tube being produced, a conventional roll stand mill is expensive to operate, and is highly uneconomical where relatively small orders are involved. In addition, a convention roll stand mill is relatively large and requires a large factory space and must be permanently installed.

In contrast to the foregoing, the instant invention contemplates the provision of a tube mill specifically designed to overcome the inherent disadvantages of a roll stand mill by providing a cold forming mill which embodies a single die and is small enough to be classified as portable and hence capable of accomplishing the functions of a portable piece of equipment.

A further object of the instant invention is the provision of a relatively inexpensive and compact tube forming mill which can be readily moved into any fabricating line for use in conjunction with other tube processing equipment, such as tube drawing equipment or coating apparatus for galvanizing or otherwise coating the tubing.

Still a further object of the instant invention is the provision of a tube forming mill embodying a single die which, once installed, does not require adjustment, the die being readily replaceable when a size change is required with no starting adjustments and the like which would require the attention of an experienced operator.

Still a further object of the instant invention is the provision of a tube mill of the character described which embodies adjustable guide means which coacts with the die to feed the tubed strip to the welding instrumentality with the seam edges accurately aligned for the welding operation.

The foregoing together with other objects of the instant invention which will appear hereinafter or which will be apparent to the skilled worker in the art upon reading this specification, are accomplished by those constructions and arrangements of parts of which exemplary embodiments shall now be described.

Reference is made to the accompanying drawings wherein.

Figure 1:
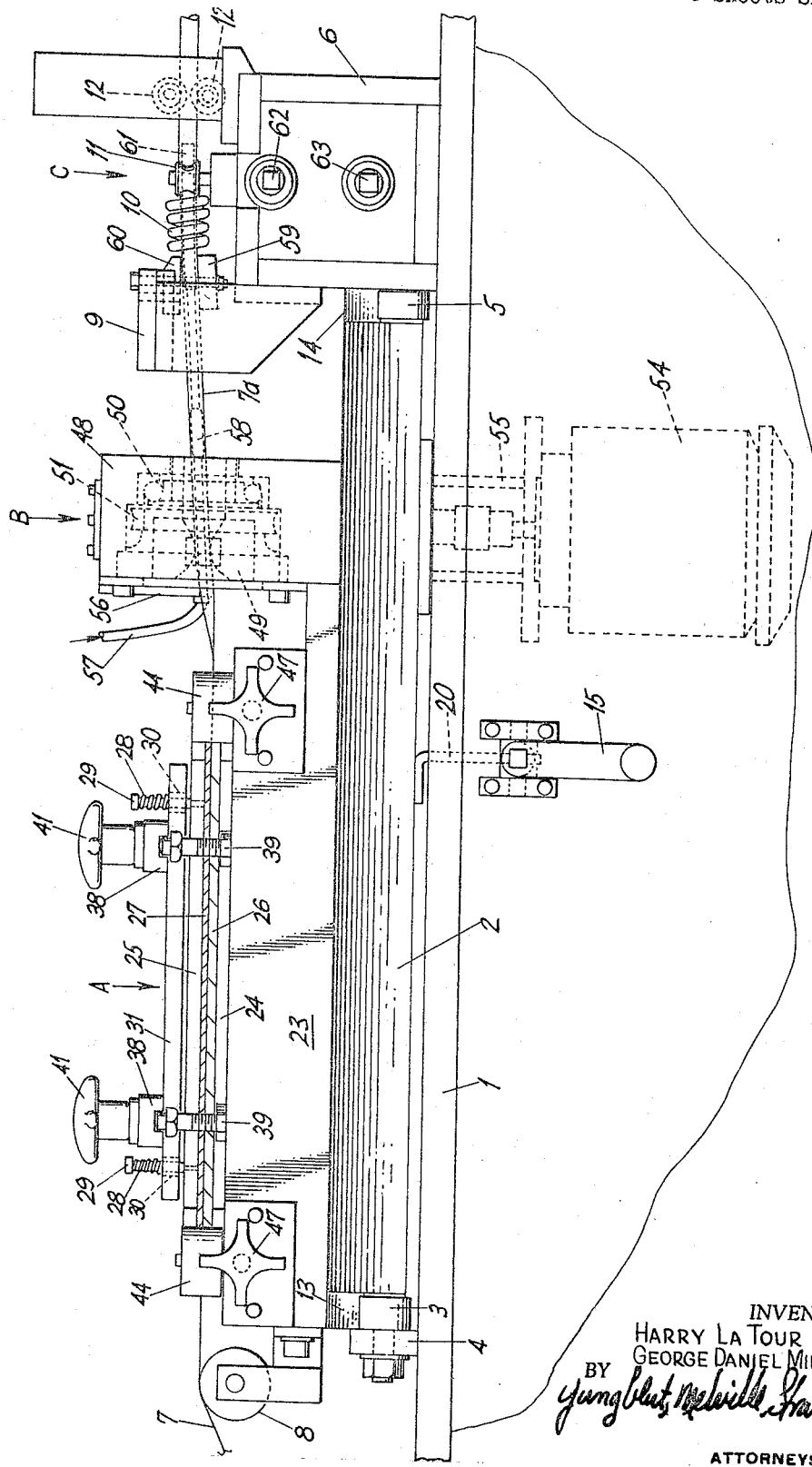
FIGURE 1 is a side elevational view of a first embodiment of the tubing mill with certain of the internal parts shown in dotted lines.

For a general understanding of the invention, reference is first made to FIGURE 1 of the drawings wherein the reference numeral 1 indicates a table or other suitable supporting surface upon which the tube mill is mounted, the mill consisting essentially of a guide box indicated generally at A, a die indicated generally at B, and a welding unit indicated generally at C. In this embodiment the guide box A and the die B are both mounted on a rotatable bed or chassis 2 supported at one end on rollers 3 (see also FIGURE 3) mounted on a bracket 4 secured to the table 1, and supported at its opposite end by a corresponding set of rollers 5 secured to the base 6 which is mounted on the table 1 and forms a support for the welding unit. A metallic strip 7 to be tubed is led into the mill over a guide roller 8 for passage through the guide box A, whereupon the strip passes through the die B wherein it is formed into tubular shape. The tubed strip, indicated at 7a, then passes through a guide member 9 which presses the edges of the seam into alignment for the welding operation which is effected by means of the high-frequency induction welding coil 10 which heats the tubing, whereupon its seam edges are forge welded together by being passed between the pair of squeeze rolls 11. The welded tube then exits from the mill through a coacting pair of ironing rolls 12.

The rotatable bed or chassis 2 is provided at its opposite ends with arcuate rockers 13 and 14 which seat on the sets of rollers 3 and 5, respectively, so that the entire chassis may be rotated about a longitudinal axis which is in axial alignment with the centerline of the welding instrumentality. Preferably, the arc of rotation of the chassis will be on the order of 5° from the horizontal in either direction—which has been found sufficient to maintain the seam in proper alignment for welding—although such angle does not constitute a limitation on the invention. Rotation of the chassis is obtained by means of the crank arm 15 which rotates shaft 16 having a threaded end 17 in threaded engagement with the bore 18 of a socket member 19 pivotally connected to the remote end of an arm 20 fixedly secured to the undersurface of the chassis 2. With such arrangement, it will be evident that rotation of the arm 15 in a clockwise direction will result in rotation of the chassis in one direction, whereas rotation of the arm 15 in a counterclockwise direction will result in rotation of the chassis in the opposite direction. If desired, the chassis may be secured in adjusted position by means of bolt 21 which extends through an arcuate slot 22 in the bracket 4.

The guide box A is mounted on the chassis and positioned to receive the incoming strip and align it for passage through the die B. It comprises a base platform 23 mounting a base plate 24 which coacts with an overlying pressure plate 25 to define a passline therebetween, the strip being contacted on its opposite sides by pads 26 and 27 formed from felt, carpeting or similar cushioning material.

The pressure plate 25 is spring mounted by means of springs 28 which surround spaced apart pairs of posts 29 which project upwardly through opening 30 in mounting plate 31. Since the springs extend between the upper surface of the mounting plate 31 and the enlarged heads at the upper ends of the posts, and are compressed therebetween, they serve to bias the pressure plate 25 upwardly against a longitudinally extending rod 32 which is medially disposed as respects the opposite side edges of the pressure plate 25, the undersurface of the rod 32 being received in a V-shaped groove 33 in the upper surface of the pressure plate, with the uppermost surface of the rod received in a corresponding groove 34 in the mounting plate 31.

Figure 3:
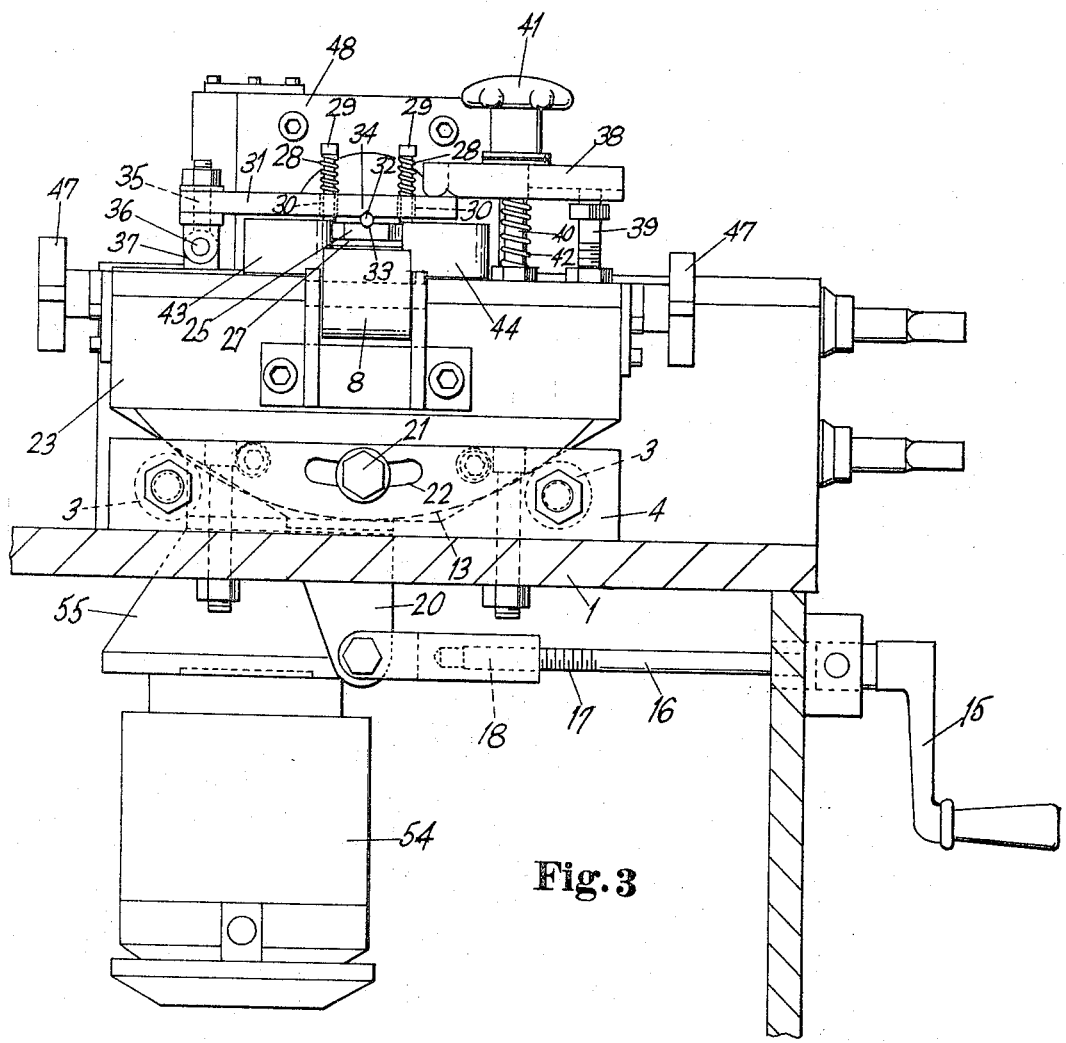
FIGURE 3 is an end elevational view taken from the left end of FIGURE 1.

The mounting plate 31 is secured along one side edge to a bracket 35 which is pivotally connected by means of a pivot pin 36 to dogs 37 secured to the base platform 23. Along its opposite side edge, the plate 31 is contacted by a spaced apart pair of clamp members 38 supported at their outer ends on posts 39, with rods 40, one of which is seen in FIGURE 3, passing freely through the clamp members and having their upper ends in threaded engagement with adjustment knobs 41. Springs 42 surround the rods 40 and extend between the undersurface of the clamp members 38 and the base ends of the rods.

With the arrangement just described, the clamp members 38 may be utilized to apply downwardly directed pressure against the mounting plate 31 which in turn is transmitted to the pressure plate 25 through the rod 32. Since the rod 32 is medially disposed with respect to the opposite side edges of the pressure plate, the clamping forces exerted by the clamping members 38 under the influence of the knobs 41 will be concentrated along the centerline of the pressure plate and hence will be uniformly applied. At the same time, the pressure plate will be free to accommodate itself to the upper surface of the strip and make planar contact therewith. It will be understood that the surfaces of the strip are actually contacted by the pads 26 and 27 which in themselves yieldably support the strip and yet maintain it in planar condition so that its opposite edges will be properly positioned for alignment by the guide rolls which will now be described.

Figure 2:
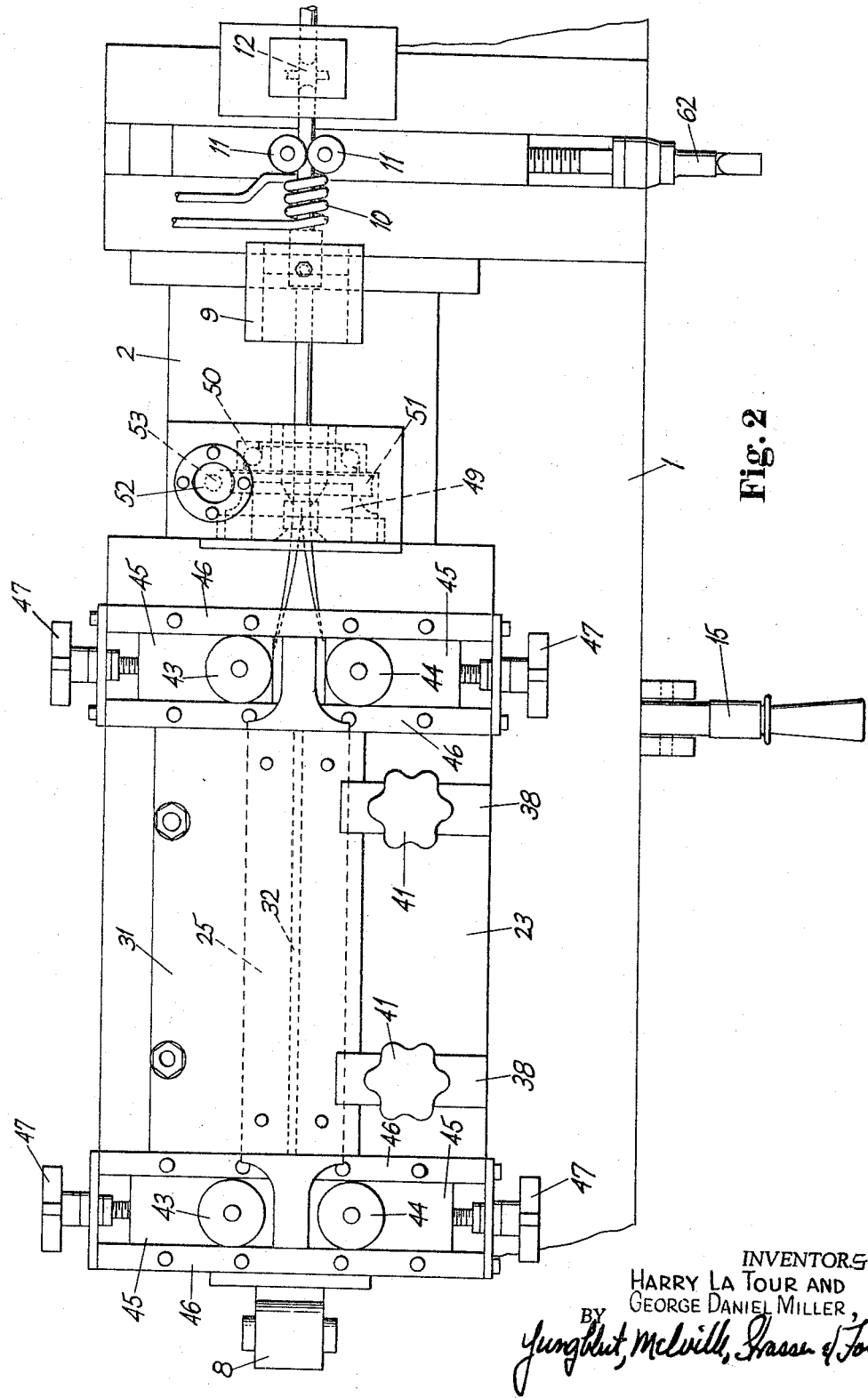
FIGURE 2 is a plan view of the mill illustrated in FIGURE 1.

The proper edge alignment of the strip as it passes through the guide box is maintained by means of the opposing sets of guide rolls 43 and 44 at the leading and trailing ends of the guide box. The sets of guide rolls have vertically disposed axes and are mounted on sliding blocks 45 (see FIGURE 2) movable laterally in ways 46 by means of adjustment knobs 47. The guide rollers thus may be individually moved toward and away from the strip and hence may be adjusted to accurately align the strip for movement through the guide box in proper registry with the forming die.

The forming die B is similar to conventional dies used in drawing wire or tubing to smaller diameters and will be mounted in a housing 48 secured to the chassis 2 and hence rotatable therewith. The die itself, indicated at 49, is symmetrical and is rotatably journaled within the housing, as by means of ball bearing assembly 50. The die is provided with a gear 51 which is in meshing engagement with a worm gear 52 mounted on a drive shaft 53 which extends downwardly through the housing 48 and chassis 2, with its lowermost end operatively connected to the drive motor 54. The motor 54 is suspended from the chassis 2 by means of a motor mount 55; and to this end it will be understood that the table 1 has a suitable opening therein (not shown) through which the motor mount extends so that the motor may move with the chassis as the latter is rotated. As shown in FIGURE 1, the housing 48 may also mount bracket means 56 which supports a conduit 57 which supplies coolant to an impeder which is located within the tubing at the welding station. The conduit 57 also serves as a convenient mounting medium for a carbide plug 58 which lies immediately beyond the die. This plug serves to expand the tubing just enough so that the seam edges do not contact each other prior to the time they pass between the squeeze rollers 11 at the welding station.

Upon passage beyond the forming die, the tubing passes through the guide member 9 wherein it is contacted on its undersurface by the wooden guide block 59 and on its upper surface by the ceramic guide block 60 which acts to bring the opposite seam edges into horizontal alignment. As already indicated, high-frequency induction welding is preferred, the tubing being heated as it passes through the induction coil 10, whereupon the seam edges are forge welded together by passage between the pair of squeeze rolls 11. An impeder 61 is positioned within the tubing in the area of the induction coil to insure efficient and properly localized heating. The tubing, when heated in this manner, will only be heated at the seam edges where it is pressed together by the squeeze rolls. While a preference has been expressed for high-frequency induction welding, it will be understood that other known welding procedures, such as high-frequency resistance welding, may be employed without departing from the invention. It will be understood also that suitable means will be provided to adjust the position of the squeeze rolls 11. Such means may include individual adjustment shafts 62 and 63 for selectively adjusting the squeeze rolls; and in this connection, reference is made to La Tour et al. United States Patent 2,992,318, dated July 11, 1961 and entitled Floating Tube Welding Apparatus, wherein such adjustment means are disclosed in detail. Subsequent to the welding operation, the welded tube passes through a pair of vertically disposed ironing rolls which act to size and shape the welded seam, whereupon the tubing may be advanced for storage or such other processing steps as may be required.

The mill just described is particularly suited for the high-speed production of small diameter tubing on the order of ¼ to 1" in diameter and in thicknesses of from 18 to 28 gauge. The ability of the guide box and die to be rotated relative to the welder enables the operator to steer the strip and maintain the seam in proper position for welding. In addition, it will be noted with reference to FIGURE 1 that the strip travels uphill from the guide box through the die to the welder. To this end, the centerline of the die is displaced upwardly from the passline of the guide box, and in turn the passline of the welder, as established by the squeeze rolls 11, is elevated with respect to the centerline of the die. In effect, this results in the tubing moving in what amounts to an arcuate path from the die to the squeeze rolls, with the unwelded seam on the outside of the arc and in tension. Such arrangement insures that the seam will not buckle prior to welding. In an exemplary embodiment wherein tubing of ½" outside diameter is being formed, the passline of the guide box is positioned 1¹/₁₆" below the passline of the welding means, with the centerline of the die lying ⅝" below the passline of the welding means. In such an installation it has been found that excellent results are obtained when the die is rotated at about 40 r.p.m., although the speed of rotation of the die may be varied depending upon the characteristics of the metallic strip being tubed. Essentially, the speed of rotation will be so chosen as to minimize build-up where the strip edges pass through the die. The manner in which the strip is advanced through the mill does not constitute a limitation upon the invention; and the strip may be pushed or pulled, or both, as will be understood by the worker in the art.

Figure 4:
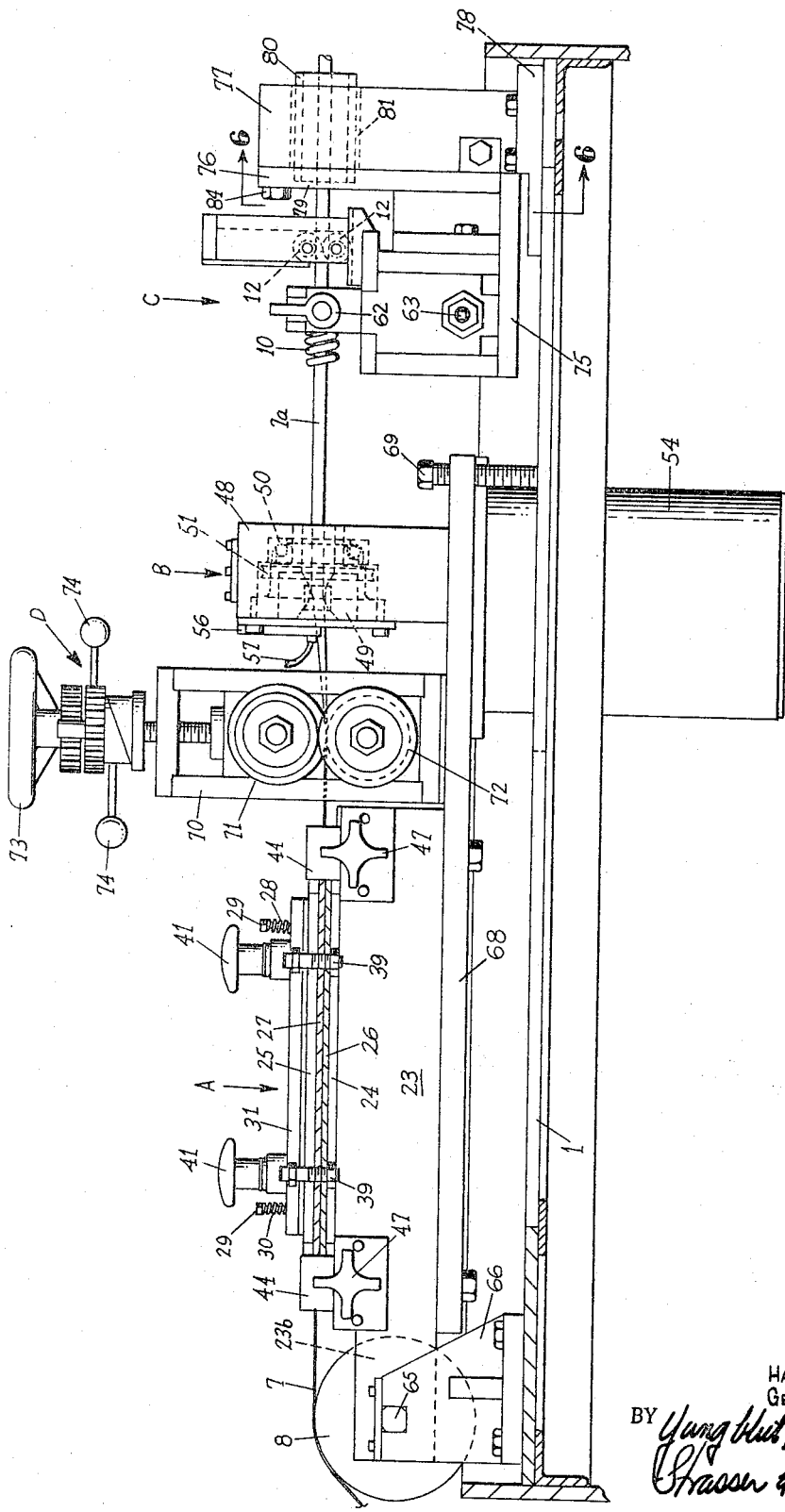
FIGURE 4 is a side elevational view of a second embodiment of the tube mill.
Figure 5:
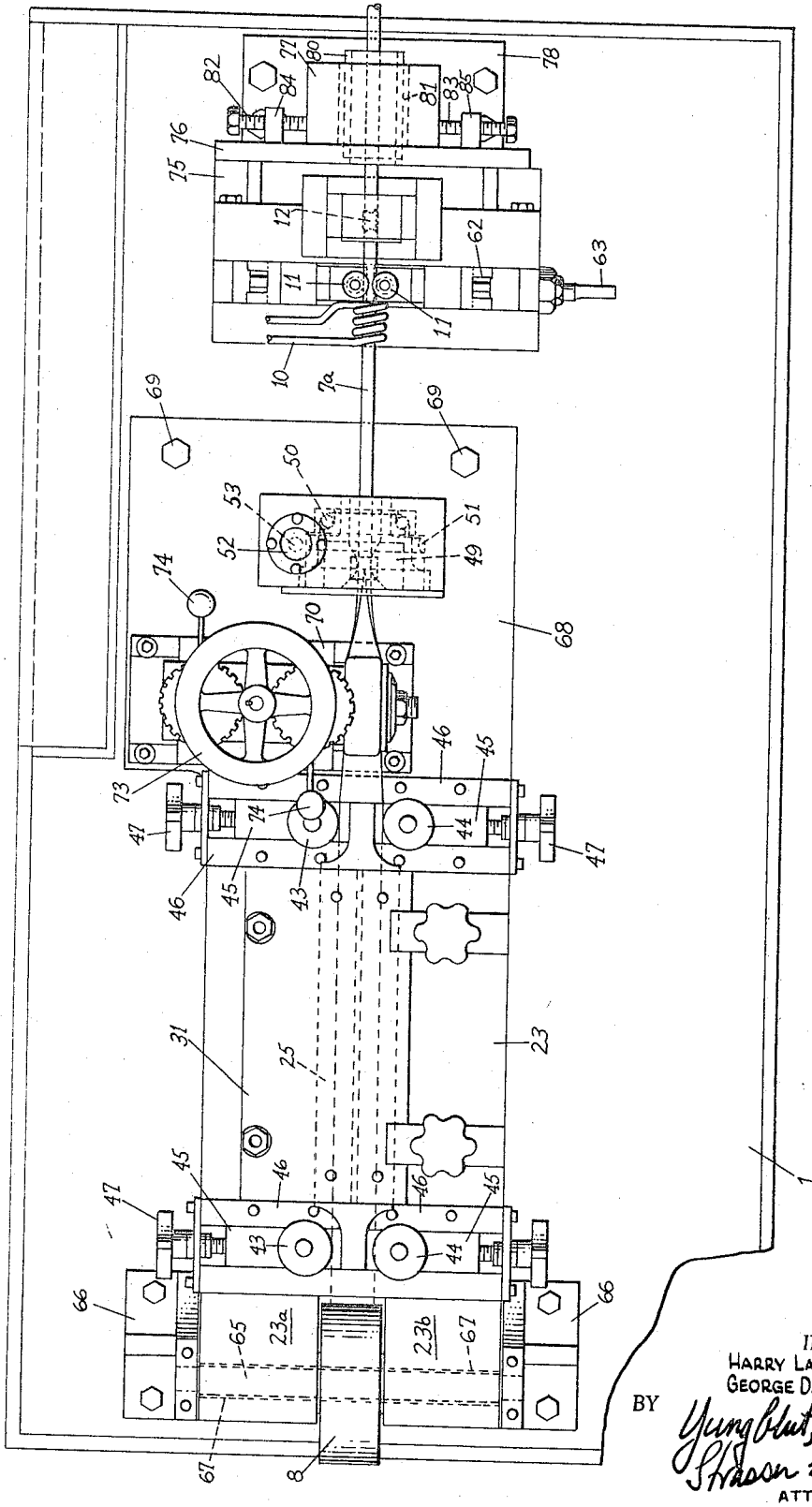
FIGURE 5 is a plan view of the mill illustrated in FIGURE 4.
Figure 6:
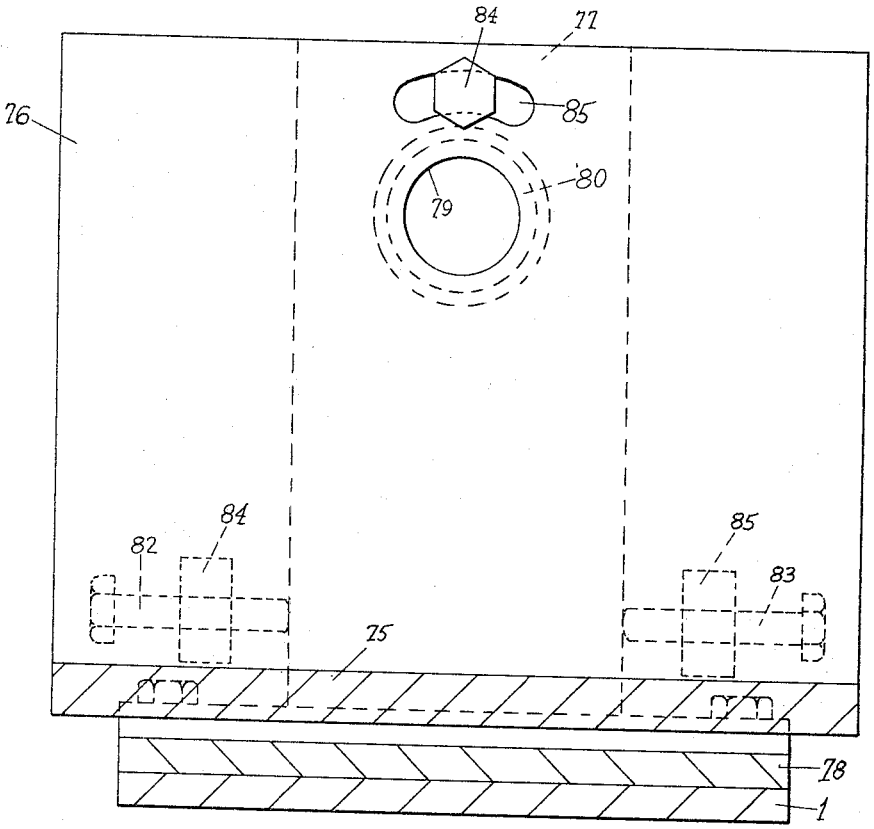
FIGURE 6 is an enlarged vertical sectional view taken along the line 6—6 of FIGURE 4.

FIGURES 4 through 6 illustrate an alternative embodiment of the invention wherein the welding unit is mounted for rotation relative to the tubing being formed and to the guide box and die, which in this instance are non-rotatably mounted. Since the basic components of this mill are essentially the same as those of the embodiment previously described, like reference numerals have been employed to identify like parts. Thus, the metallic strip 7 is led into the mill over the guide roller 8 which, in this embodiment, is rotatably mounted on a shaft 65 the opposite ends of which are received in stands 66. The base platform 23 of the guide box has a pair of forwardly projecting extensions 23a and 23b which, as best seen in FIGURE 5, have bores 67 therein through which the shaft 65 passes. A chassis member 68 is secured to the underside of the base platform 23, the chassis member projecting rearwardly of the guide box so as to support the die assembly B together wtih a forming roll unit, indicated generally at D, which is interposed between the guide box and the die assembly. At its trailing end, the chassis 68 is supported by means of adjustment screws 69 which project downwardly through the chassis member where their lowermost ends seat on the table or supporting surface 1.

The arrangement just described effectively serves to mount the chassis 68 and the parts mounted thereon for pivotal movement about the axis of shaft 65 which is horizontally disposed and perpendicular to the passline of the strip. By turning the adjustment screws 69, the passline of the strip through guide box, forming rolls, and die assembly may be raised or lowered with respect to the horizontal and hence to the passline of the welding unit C. Normally, the centerline of the die will be below passline of the welding unit so that the tubing will move in an arcuate path with the unwelded seam on the outside of the arc and in tension. The pivotal mounting of the chassis permits relative adjustment between the die and the welding unit in accordance with the diameter of the tubing being formed.

The forming roll unit D is of known character and comprises a carriage 70 mounting a pair of forming rolls 71 and 72, the roll 72 underlying the strip being of concave configuration, whereas the roll 71 overlying the strip is of mating convex configuration. The forming rolls which lie intermediate the guide box and die, serve to initially bend the opposite side edges of the strip prior to the passage of the strip through the die. Where the strip edges are preformed in this manner, a slightly larger die may be used, in which event the edges of the strip will not be forced together in the die and the interior plug may be omitted. The forming rolls serve to minimize die pickup and to eliminate flats which will sometimes occur adjacent the seam depending upon the size and gauge of the tubing being formed. It will be understood that adjustment of the rolls will be achieved in known fashion utilizing the hand wheel 73 and adjustment levers 74. It also will be understood that such forming rolls may be utilized in the embodiment of the invention illustrated in FIGURES 1 through 3, the forming roll unit being mounted on the rotatable carriage intermediate the guide box and die.

In this embodiment the welding unit C is mounted on a horizontally disposed platform or chassis member 75 which overlies and is spaced upwardly from table 1, the platform 75 having an upwardly extending mounting plate 76 at one end thereof by means of which the welding unit is suspended for rocking movement relative to mounting block 77 which is fixedly secured to table 1 by means of mounting foot 78.

The mounting plate 76 has a circular opening 79 therein through which the formed tubing is adapted to pass following welding, the opening being aligned with the passline of the welding unit and of a size to permit the tubing to freely pass therethrough. A hollow mounting shaft 80 surrounds opening 79 and projects rearwardly from the plate 76 to which the shaft is fixedly secured. The shaft 80 is journaled in a bearing 81 extending through the mounting block 77, the centerline of the bearing also being in axial alignment with the passline of the welding unit.

With this arrangement, the platform or chassis member 75 and the welding unit mounted thereon hangs from the mounting shaft 80 and is rotatable relative to the mounting block 77. Rotation of the chassis is accomplished by means of adjustment screws 82 and 83 which extend through ears 84 and 85, respectively, projecting rearwardly from mounting plate 76, the innermost ends of the adjustment screws contacting the opposite sides of block 77. It will be evident that by loosening one of the screws and tightening the other, the mounting plate 76 will be rotated from side-to-side about the longitudinal axis of mounting shaft 80. Once the desired rotational position of the welding unit has been established, the plate 76 may be fixedly secured relative to block 77 by means of lock screw 84 which, as seen in FIGURE 6, passes through arcuate slot 85 in plate 76 and is in threaded engagement with block 77.

The welding unit is thus capable of being steered relative to the seam in the tubing, and hence the proper alignment may be maintained between the welder and the seam being welded. As in the case of the first embodiment, adjustment means are provided to adjust the squeeze rolls 11 and ironing rolls 12.

Modifications may be made in the invention without departing from its spirit and purpose. For example, it is within the spirit of the invention to mount the entire guide box assembly for lateral movement relative to the chassis so that the strip may be shifted laterally without having to individually adjust the sets of rolls 43, 44. The entire guide box may be made detachable from the chassis so that a different size guide box may be substituted should the conditions of use so require. Similarly, the die assembly may be readily replaced, and the die housing may also be made detachable for replacement. It will be evident that the parts of the welding unit may also be made replaceable so that the entire device may be quickly converted to handle a wide range of strip sizes and gauges. It also may be pointed out that the device need not be used in upright position, as illustrated, but may be turned sidewise, as might be required depending upon the orientation of other equipment with which the mill might be employed. Consequently, in the claims which follow references to surfaces and the like as being "upper" or "lower" or other such designations are intended to be non-limiting excepting insofar as they indicate the positioning of the parts relative to the strip and to each other.

The embodiments of the invention in which an exclusive property or privilege is claimed are defined as follows:

1. In combination in apparatus wherein a metallic strip is continuously formed into tubing having a longitudinal seam and a welding means defining a passline for the formed tubing acts to weld together the opposite edges of the seam, a guide box and a tube forming die mounted on a common support in advance of the welding means, said welding means being mounted on a separate support, said guide box being positioned in advance of said die and acting to receive a continuous metal strip and align it for passage through said die, said tube forming die comprising an annular die member which forms the strip into tubular shape as it passes therethrough with the opposite edges of the strip approaching each other to define a longitudinal seam, and means for mounting one of said supports for rotation relative to the other about an axis disposed in the same direction as said passline of the welding means, whereby to adjust the position of the longitudinal seam of the tubing and maintain it in alignment for welding.

2. The combination claimed in claim 1 wherein said guide box includes adjustment means for displacing the strip laterally with respect to its path of travel.

3. The combination claimed in claim 2 wherein said guide box additionally includes a base platform mounting a base plate, a pressure plate overlying said base plate and defining a passline for the strip therebetween, means for yieldably mounting said pressure plate for contact with a surface of the metallic strip, and means for applying pressure to said pressure plate to press it into contact with the said surface of the strip.

4. The combination claimed in claim 3 wherein the means for yieldably mounting said pressure plate comprises an overlying mounting plate pivotally connected along one side edge to said base platform and spring means for operatively connecting said pressure plate to said mounting plate, and wherein the means for applying pressure to said pressure plate comprises clamp means positioned to engage the opposite side edge of said mounting plate to apply clamping pressure thereto, and means intermediate said pressure plate and said mounting plate for transmitting the applied clamping pressure from said mounting plate to said pressure plate.

5. The combination claimed in claim 4 wherein said pressure transmitting means comprises a rod extending lengthwise of said pressure plate along the centerline thereof, the undersurface of said mounting plate and the upper surface of said pressure plate having opposed longitudinal grooves therein to receive and position said rod, said pressure plate being free to pivot about said rod.

6. In combination in apparatus wherein a metallic strip is continuously formed into tubing having longitudinal seam and a welding means defining a passline for the formed tubing acts to weld together the opposite edges of the seam, a guide box and a tube forming die mounted on a support in advance of the welding means and in alignment therewith, said guide box being positioned in advance of said die and acting to receive a continuous metallic strip and align it for passage through said die, said tube forming die comprising an annular die member through which the strip is passed, said annular die member acting to form the strip into tubular shape with the opposite edges of the strip approaching each other to define a longitudinal seam, and means for mounting said guide box and said die for rotation about an axis disposed in the same direction as said passline of the welding means, whereby to adjust the position of the longitudinal seam and maintain it in alignment for welding.

7. The combination claimed in claim 6 wherein the means for mounting said guide box and said die for rotation comprises a common chassis, means for mounting said chassis for adjusting movement in an arcuate path, and means for securing said chassis in the adjusted position.

8. The combination claimed in claim 7 wherein said annular die member is rotatably mounted in a housing secured to said chassis, and wherein said chassis mounts drive means for rotating said annular die.

9. In combination in apparatus wherein a metallic strip is continuously formed into tubing having a longitudinal seam and a welding means defining a passline for said tubing acts to weld together the opposite edges of the seam, a guide box and a tube forming die mounted on a support in advance of the welding means and in alignment therewith, said guide box being positioned in advance of said die and acting to receive a continuous metallic strip and align it for passage through said die, said tube forming die comprising an annular die member through which the strip is passed, said annular die member acting to form the strip into tubular shape with the opposite edges of the strip approaching each other to define a longitudinal seam, and means for mounting said welding means for rotation about an axis corresponding to the passline of said welding means, whereby to adjust the position of the welding means with respect to the longitudinal seam in the tubing being formed to maintain it in alignment between the welding means and the seam being welded.

10. The combination claimed in claim 9 wherein the means for mounting said welding means for rotation comprises a chassis member pivotally secured to a fixed support, and wherein means are provided for adjusting movement of said chassis member relative to said fixed support.

11. The combination claimed in claim 10 wherein said chassis member includes a vertically disposed plate, which is pivotally connected to said fixed support by means of a hollow mounting shaft the centerline of which is in axial alignment with the passline of said welding means, and wherein means are provided for securing said vertically disposed plate in the adjusted position.

12. In combination in apparatus wherein a metallic strip is continuously formed into tubing having a longitudinal seam and a welding means defining a passline for said tubing acts to weld together the opposite edges of the seam, a guide box and a tube forming die mounted on a common support in advance of said welding means and in alignment therewith, said welding means being mounted on a separate support, means for mounting one of said supports for rotation about an axis disposed in the same direction as said passline of the welding means, said guide box being positioned in advance of said die and acting to receive a continuous metal strip and align it for passage through said die, said guide box having guide plates adapted to contact the opposite surfaces of the strip and define a passline therebetween, said tube forming die comprising an annular die member positioned to receive the strip from the guide means and from it into tubular shape as the strip passes through the die member with the opposite edges of the strip approaching each other to define a longitudinal seam extending along the upper surface of the tubing so formed, the centerline of said die member lying below the passline of the welding means, whereby the tubing travels in an arcuate path form the die member to the welding means with the unwelded seam in tension.

13. The combination claimed in claim 12 wherein a roll stand is mounted on said common support between said guide box and said annular die member, said roll stand mounting coacting forming rolls operative to bend the opposite side edges of the strip upwardly prior to its passage through said annular die.

14. The combination claimed in claim 13 wherein the support for said welding means is rotatably mounted, and wherein said common support is mounted for pivotal movement about an axis which is perpendicular to the axis defined by the passline of the welding means.

15. In combination in apparatus wherein a metallic strip is continuously formed into tubing having a longitudinal seam and a welding means defining a passline for said tubing acts to weld together the opposite edges of the seam, a guide box and a tube forming die mounted on a common chassis in advance of said welding means and in alignment therewith, for mounting said chassis for rotation about an axis disposed in the same direction as said passline of the welding means, said guide box being positioned in advance of said die and acting to receive a continuous metallic strip and align it for passage through said die, said guide box having guide plates adapted to contact the opposite surfaces of the strip and define a passline therebetween, which passline lies below the passline of the welding means, said tube forming die comprising an annular die member positioned to receive the strip from the guide means and form it into tubular shape as the strip passes through the die member with the opposite edges of the strip approaching each other to define a longitudinal seam extending along the upper surface of the tubing so formed, the centerline of said die member lying below the passline of the welding means but above the passline of said guide box, whereby the tubing travels in an arcuate path at least from the die member to the welding means with the unwelded seam in tension.

16. The combination claimed in claim 15 wherein said annular die member is rotatably mounted in a housing supported on said chassis and wherein said chassis also mounts drive means for rotating said die.

17. The combination claimed in claim 16 wherein the means for mounting said chassis for rotation comprises arcuate rockers at the opposite ends of said chassis, and spaced apart sets of rollers positioned to contact and support said rockers, said rollers being mounted on a fixed base for said chassis.

18. In combination in apparatus for forming metallic strip into tubing having a welded longitudinal seam, a guide box, a tube forming die, and a welding station in alignment in one order named, said guide box and said tube forming die being mounted on a first support and said welding station being mounted on a second support, one of said supports being rotatable relative to the other in an arcuate path about an axis disposed in the same direction as said alignment, said guide box including adjustment means for aligning said strip horizontally with respect to said tube forming die, said tube forming die comprising an annular die element positioned to receive the strip from the guide box and form it into tubing having a longitudinal seam, said welding station including a welding means and a pair of squeeze rollers positioned to press together the edges of the longitudinal seam.

19. The combination claimed in claim 18 wherein a tube guide is provided at said welding station in advance of said welding means and squeeze rolls, said tube guide including a guide block positioned to contact the longitudinal seam and acting to press the opposite edges of the longitudinal seam into alignment with each other.

20. The combination claimed in claim 18 wherein said annular die element is mounted in a housing secured to said first support, and wherein said housing mounts a conduit which extends through said die element and is adapted to lie within the formed tubing, said conduit projecting in the direction of said welding station and mounting an impeder positioned to coact with said welding means.

21. The combination claimed in claim 20 wherein said conduit also mounts a plug lying in advance of said welding means and of a size to contact the inner surface of the tubing being formed and hold the edges of the longitudinal seam is slightly spaced apart relation.

22. The combination claimed in claim 18 wherein said squeeze rolls define a passline for said tubing, the annular die element having a centerline which is spaced downwardly from the passline of said squeeze rolls.

23. The combination claimed in claim 22 wherein said guide box includes means for urging said pressure plate into contact with the upper surface of the strip as it passes therethrough.

24. The combination claimed in claim 23 wherein said guide box includes a base plate and overlying pressure plate defining therebetween a passline for the strip, and wherein the passline so defined is spaced downwardly from the centerline of said annular die element.

References Cited
UNITED STATES PATENTS

| | | | |
|---|---|---|---|
| 2,845,038 | 7/1958 | Crawford | 228—49 |
| 3,014,118 | 12/1961 | Vassar | 219—59 |
| 3,170,427 | 2/1965 | Ruple et al. | 228—49 |
| 3,182,171 | 5/1965 | Persson | 228—49 |
| 3,266,703 | 8/1966 | Ruple | 228—49 |

JOHN F. CAMPBELL, *Primary Examiner.*

MARTIN L. FAIGUS, *Assistant Examiner.*